J. H. Tuttle.
Saw.
No. 4,096.
Reissued Aug. 9, 1870.
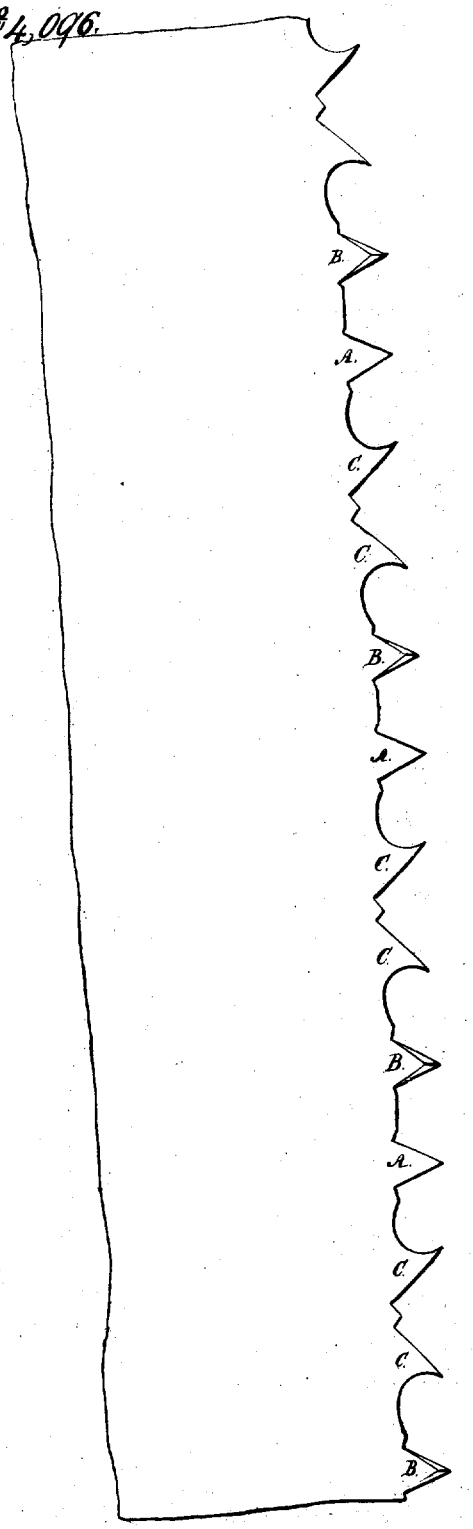
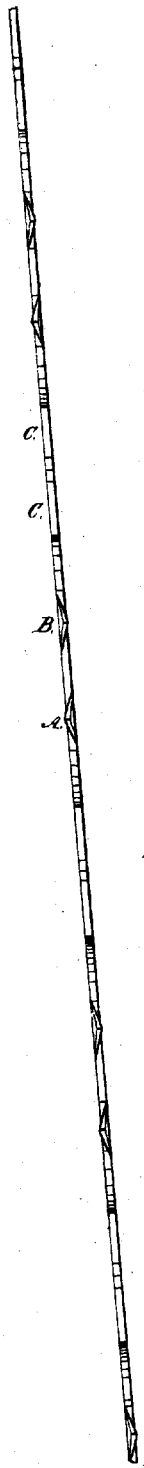
N. PETERS, PHOTO-LITHOGRAPHER, WASHINGTON, D. C.

United States Patent Office.

ELISHA P. WHEELER, EDWARD M. MADDEN, AND WILLIAM CLEMSON, OF MIDDLETOWN, NEW YORK, ASSIGNEES OF JOSEPH H. TUTTLE.

*Letters Patent No.* 9,807, *dated June* 21, 1853; *extended seven years*; *reissue No.* 4,096, *dated August* 9, 1870.

IMPROVEMENT IN SAWS.

The Schedule referred to in these Letters Patent and making part of the same

Be it known that JOSEPH H. TUTTLE, of Seneca, in the county of Ontario and State of New York, did invent certain new and useful Improvements in Saws, of which the following is a specification.

This invention consists—

First, in an arrangement upon a saw-blade, made from a single thickness of plate, of alternate sets of fleam-teeth for scoring the sides of the kerf, and curved planing-teeth, placed back to back, for cutting and removing the wood between the scores.

Second, in so constructing and arranging the sets of scoring and curved planing-teeth upon a saw-blade, made from a single thickness of plate, that each planing-tooth shall serve as a gauge-tooth to it fellow, and thereby govern the depth of the cut.

*Description of the Drawing.*

Figure 1 represents an edge view of the teeth upon a saw-blade.

Figure 2 is a side elevation of the same.

*General Description.*

A A and B B represent the fleam or knife-edged teeth, and

C C the curved planing-teeth.

The points of the fleam-teeth are set in opposite directions, those A A being set to the left hand, and those B B to the right hand, and their edges are beveled off in the direction of the set of the teeth.

The planing-teeth C are cut away under their front or cutting-edges in the form of an irregular curve, so as to give them a hook-shape, making a planing or cutting instead of a rasping edge The back of the teeth are slightly curved, so as to stand at angle of about forty-five degrees, and are placed contiguous to each other, back to back, and curve in opposite directions, at a suitable distance from each other, and only one of each of the sets is in actual cutting operation at a time, namely, those which curve in the direction in which the saw is moving for the time being, so that the others, or those curved in the opposite direction, act as guides to the cutting-teeth, to prevent them taking too rank a hold on the wood.

The fleam-cutters, of which two are placed between every two sets of planing-teeth or cutters, have their points projecting beyond those of the planing-teeth, and, when in operation, cut two straight scores, one on each side of the kerf.

The teeth C, which plane out and remove the wood between the scores, are placed at such distances apart as to allow each alternately to cut to a proper depth, and become guides to each other alternately, as well as permanent guides to the scoring or fleam-cutters, to prevent them cutting deeper than a given distance into the wood, thus, in a word, making the teeth which are not cutting serve as guides to those that are, and enabling the saw to cut from end to end in both directions, as well as to be equally applicable to slitting and cross-cutting.

The depth of the cut being limited, the teeth are prevented from being drawn into the wood, or from choking, and gives great efficiency to the operation of the saw.

By this method of arranging the teeth in pairs or sets upon the blade, a saw is produced which cuts through its entire length in both directions.

The planing-teeth serve alternately as gauges for each other, while each is allowed to cut to a proper depth, and also as gauges to the fleam-cutters, which produces a uniform continuous scoring and planing operation at each reciprocation in either direction, as it were, instead of an irregular rasping one.

We are aware of the saw patented to Ebenezer Clark, April 3, 1849, and disclaim the construction therein shown and described, as the saw was constructed from three thicknesses of plates, which formed the blade, and the teeth were insertable. The hooked or curved planing-teeth were pivoted in a mortise in the center-plate in such manner as to turn back when reciprocated in the direction to which they curved. This saw has not the teeth arranged in sets or pairs of scoring alternated with sets or pairs of curved planing-teeth set back to back.

We are also aware of the saw shown and described in the rejected application of Bradford Rowe, withdrawn November 23, 1850, and we also disclaim the construction therein shown and described, as the saw is intended to be straight on the cutting points of teeth, and the teeth are not arranged in sets or pairs of scoring, alternated with sets or pairs of curved planing-teeth, set back to back, and the teeth are so arranged and set as to cut from the end to the center of its length, and if it reciprocates in contact with the wood beyond the center of the saw, longitudinally, it will not cut beyond the center line in such reciprocation, and, consequently, has no analogous function with the construction herein shown and described.

*Claims.*

What is claimed as the invention of JOSEPH H. TUTTLE is—

1. The saw herein described, having a series of alternate sets of fleam and curved planing-teeth located upon the same plate or blade, the sets of fleam-teeth for scoring the sides of the kerf, and sets of curved planing-teeth for removing the wood between the scores, when constructed and arranged to operate in the manner shown and described.

2. A saw, as above described, having a series of alternate sets or pairs of scoring and curved planing-teeth, the sets or pairs of scoring set to opposite sides of the blades to score the wood on the opposite sides of the kerf, the sets or pairs of curved planing-teeth set back to back, and projecting less than the scoring teeth, and when thus constructed and arranged, act as gauges to control the depth that the scoring-teeth may cut, substantially in the manner described and shown.

ELISHA P. WHEELER.
EDWARD M. MADDEN.
WM. CLEMSON.

Witnesses:
C. A. DURGIN,
EDWARD E. OSBORN,
LEMUEL WHEELER,
G. R. KIMBALL.